US006010272A

United States Patent [19]

Littman

[11] Patent Number: 6,010,272

[45] Date of Patent: Jan. 4, 2000

[54] BALL JOINT WITH TWO-PIECE BEARING AND SPRING

[75] Inventor: Gary W. Littman, Shelby Township, Mich.

[73] Assignee: TRW Inc., Lyndhurst, Ohio

[21] Appl. No.: 09/196,021

[22] Filed: Nov. 19, 1998

[51] Int. Cl.[7] .......... F16C 11/06

[52] U.S. Cl. .......... 403/131; 403/129; 403/136; 403/138; 403/144

[58] Field of Search .......... 403/122, 127, 403/128, 129, 131, 132, 135, 136, 137, 138, 144

[56] References Cited

U.S. PATENT DOCUMENTS

| | | | |
|---|---|---|---|
| 1,651,522 | 12/1927 | Gold | 403/136 X |
| 1,799,141 | 3/1931 | Hufferd et al. | 403/136 |
| 2,426,358 | 8/1947 | Klages et al. | 403/136 |
| 2,521,335 | 9/1950 | Booth | 403/128 X |
| 3,220,755 | 11/1965 | Gottschald et al. | 403/136 |
| 3,951,557 | 4/1976 | Herbenar | 403/138 |
| 4,101,227 | 7/1978 | Herbenar et al. . | |
| 4,154,544 | 5/1979 | Gair . | |
| 4,386,869 | 6/1983 | Smith | 403/39 |

*Primary Examiner*—Lynne H. Browne
*Assistant Examiner*—John R. Cottingham
*Attorney, Agent, or Firm*—Tarolli, Sundheim, Covell, Tummino & Szabo

[57] ABSTRACT

A ball joint (10) comprises a socket (60), a bearing (100), and a stud (80). The bearing (100) supports a first end portion (82) of the stud (80) in the socket (60) for movement relative to the socket. The stud (80) has a second end portion (84, 86) projecting from the socket (60) for connecting the stud for movement with the first suspension member (14). The socket (60) has a mounting portion (64) for connecting the socket for movement with the second suspension member (40) relative to the stud (80) and the first suspension member (14). The bearing (100) includes first and second relatively movable bearing elements (110, 130). The first bearing element (110) is movable with the first end portion (82) of the stud (80) in the socket (66), and has a pivot center (118). The second bearing element (130) is disposed between the first bearing element (110) and the socket (60), and supports the first bearing element and the stud (80) for pivotal movement relative to the socket about the pivot center (118). A biasing spring (150) acting between the socket (60) and the second bearing element (130) yieldably resists movement of the first and second bearing elements (110, 130) relative to the socket.

8 Claims, 2 Drawing Sheets

BALL JOINT WITH TWO-PIECE BEARING AND SPRING

BACKGROUND OF THE INVENTION

1. Technical Field

The present invention relates to a ball joint for supporting a first suspension member for movement relative to a second suspension member. In particular, the present invention relates to a ball joint which can accommodate tolerance stackup between two suspension members during assembly of the suspension members with the ball joint.

2. Description of the Prior Art

A typical motor vehicle suspension includes a plurality of members, such as control arms, steering knuckles, etc., which are interconnected for relative movement by ball joints. Each suspension member is manufactured to certain tolerances. Tolerance stackup of two suspension members can produce misalignment of the suspension members, placing undesired loads on the ball joint after the suspension is assembled.

SUMMARY OF THE INVENTION

The present invention is a ball joint for supporting a first suspension member for movement relative to a second suspension member. The first and second suspension members define a steering axis. The ball joint comprises a socket, a bearing in the socket, and a stud. The bearing supports a first end portion of the stud in the socket for movement relative to the socket. The stud has a second end portion projecting from the socket for connecting the stud for movement with the first suspension member. The socket has a mounting portion for connecting the socket for movement with the second suspension member relative to the stud and the first suspension member.

The bearing comprises first and second relatively movable bearing elements. The first bearing element is movable with the first end portion of the stud in the socket, and has a pivot center. The second bearing element is disposed between the first bearing element and the socket, and supports the first bearing element and the stud for pivotal movement relative to the socket about the pivot center. A biasing spring acting between the socket and the second bearing element yieldably resists movement of the first and second bearing elements relative to the socket.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
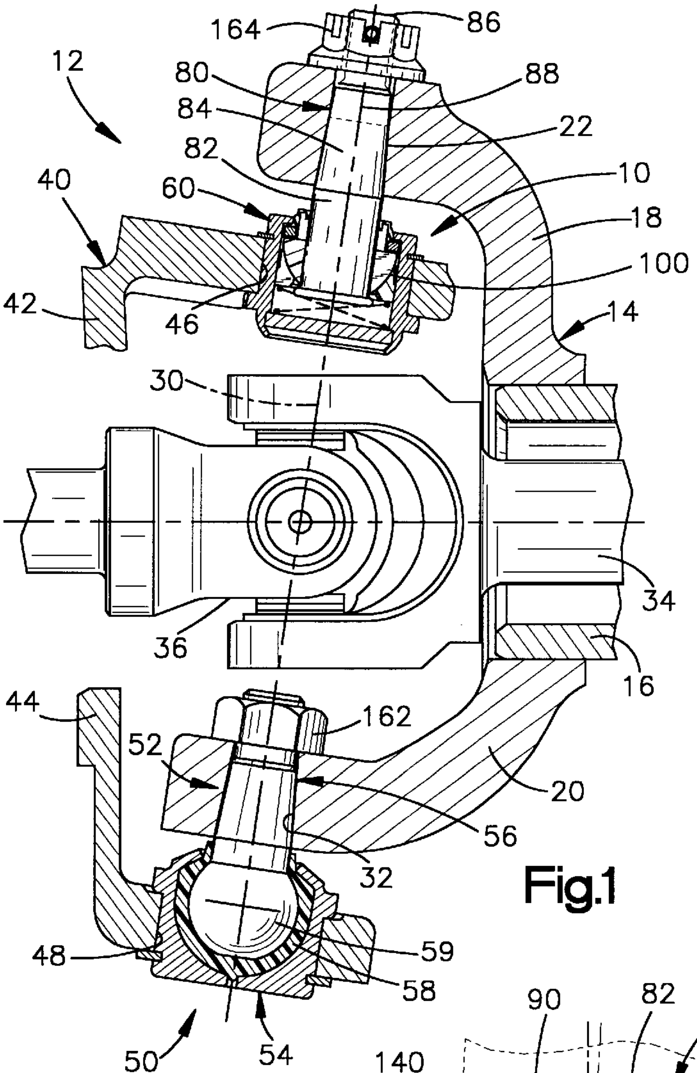
FIG. 1 is a schematic illustration of a portion of a vehicle suspension including a ball joint constructed in accordance with a first embodiment of the present invention.

The present invention relates to a ball joint for supporting a first suspension member for movement relative to a second suspension member. The present invention is applicable to various ball joint constructions. As representative of the invention, FIG. 1 illustrates a ball joint 10.

The ball joint 10 is an upper ball joint of a vehicle suspension 12 of a generally conventional construction. The suspension 12 includes a first suspension member or steering yoke 14 fixed to the vehicle frame or body (not shown). The steering yoke 14 has a central portion 16 and upper and lower arms 18 and 20.

The upper steering yoke arm 18 has a tapered opening 22. A corresponding tapered opening 32 is formed in the lower steering yoke arm 20. The openings 22 and 32 define a steering axis 30 of the suspension 12, on which the openings 22 and 32 are preferably centered.

An engine driven shaft 34 extends through the central portion 16 of the steering yoke 14. The driven shaft 34 has a universal joint 36. The driven shaft 34 is connected with a vehicle road wheel (not shown) supported for rotation on a second suspension member or steering knuckle 40.

The steering knuckle 40 has an upper arm 42 and a lower arm 44. The upper steering knuckle arm 42 has an opening 46. The opening 46 has a cylindrical configuration preferably but not necessarily centered on the steering axis 30. A corresponding opening 48 is formed in the lower steering knuckle arm 44. The opening 48 has a cylindrical configuration preferably but not necessarily centered on the steering axis 30.

Because of design or manufacturing tolerances, the upper and lower openings 22 and 32 in the steering yoke 14 may not be coaxial, but may instead be misaligned. Similarly, because of design or manufacturing tolerances, the upper and lower openings 46 and 48 in the steering knuckle 40 may not be coaxial, but may instead be misaligned relative to each other and/or to the openings 22 and 32 in the steering yoke 14. Further, the distance between the upper steering yoke arm 18 and the upper steering knuckle arm 42, as measured along the steering axis 30, may vary because of manufacturing tolerances.

A lower ball joint 50 joins the lower steering yoke arm 20 and the lower steering knuckle arm 44. The lower ball joint 50 is of a conventional construction and includes a ball stud 52 and a socket 54. The ball stud 52 has a shank portion 56 which is fixed in the opening 32 in the lower steering yoke arm 20. The shank portion 56 connects the ball stud 52 for movement with the lower steering yoke arm 20. The socket 54 is fixed in the opening 48 in the lower steering knuckle arm 44. The socket 54 is thus connected for movement with the lower steering knuckle arm 44.

A bearing 58 is located in the socket 54 of the lower ball joint 50. The ball stud 52 has a ball end portion 59 received in the bearing 58 and rotatable in the bearing to provide for relative rotation between the lower steering knuckle arm 44 and the lower steering yoke arm 20.

The upper ball joint 10 (FIG. 2) includes a socket 60. The socket 60 is made from metal and has a cylindrical side wall 62. A mounting flange 64 extends radially outward from the side wall 62 of the socket 60, adjacent to a closed lower end 65 of the socket.

A lower rim 66 of the socket 60 extends axially from the side wall 62 adjacent the mounting flange 64. The lower rim 66 secures a cap 70 in position in the socket 60. The cap 70 closes the lower end 65 of the socket 60. The side wall 62 and the cap 70 define a chamber 72 in the socket 60. An upper rim 74 of the socket 60 projects radially inward from the side wall 62 at an open upper end 76 of the socket.

The upper ball joint 10 also includes a metal stud 80. The stud 80 has an elongate, generally cylindrical configuration.

The stud 80 has a cylindrical first section 82 (FIGS. 1 and 2), a tapered second section 84 (FIG. 4), and a threaded end section 86, all centered on a longitudinal axis 88 of the stud. The first section 82 of the stud 80 has a cylindrical outer surface 90 centered on the axis 88. A lower end portion 92 of the stud 80 is formed as a flange or rib which extends radially outward from the cylindrical surface 90.

A bearing 100 is located in the chamber 72. The bearing 100 includes a first or inner bearing element 110, and a second or outer bearing element 130. The bearing elements 110 and 130 are made from a known plastic material suitable for use as a ball joint bearing.

The inner bearing element 110 is a split bearing having a slot 111. The inner bearing element 110 encircles the first section 82 of the stud 80. The inner bearing element 110 has a cylindrical inner surface 112 defining a central opening 114 in the inner bearing element. The cylindrical inner surface 112 on the inner bearing element 110 is in sliding engagement with the cylindrical outer surface 90 of the first section 82 of the stud 80.

The inner bearing element 110 has a downward facing hemispherical outer surface 116 centered on a pivot center 118 of the bearing 110. The inner bearing element 110 has a radially extending upper end surface 120 which lies in a plane extending through the pivot center 118. The upper end surface 120 faces the upper rim 74 of the socket 60. The stud axis 88 extends through the pivot center 118 of the bearing 80.

The outer bearing element 130 is also a split bearing having a slot 131. The outer bearing element 130 is disposed between the inner bearing element 110 and the side wall 62 of the socket 60, at a location generally below and outside of the inner bearing element. The outer bearing element 130 has a radially extending lower end surface 132 facing the cap 70. The outer bearing element 130 has an axially extending, cylindrical outer surface 134 in sliding engagement with the cylindrical side wall 62 of the socket 60. The outer bearing element 130 has an upward facing spherical inner surface 136 centered on the pivot center 118. The spherical inner surface 136 of the outer bearing element 130 is in sliding engagement with the spherical outer surface 116 of the inner bearing element 10.

The bearing 100 is captured axially in the socket 60 between a seal 140 and a spring 150. The seal 140 is made from an elastomeric material. A first portion 142 of the seal 140 is molded around a metal retaining ring 144. The upper rim 74 of the socket 60 is rolled over to clamp the first seal portion 142, including the retaining ring 144, between the socket rim 74 and the upper end surface 120 of the inner bearing element 110. The elastomeric material of the first seal portion 142 seals against the socket 60.

A second portion 146 of the seal 140 projects radially inward from the first portion 142 of the seal. The second portion 146 engages and seals against the cylindrical outer surface 90 of the first section 82 of the stud 80. As a result, a seal is effected between the stud 80 and the socket 60, to prevent the ingress of foreign material into the socket.

The spring 150 is disposed in the chamber 72 in the socket 60, between the cap 70 and the lower end surface 132 of the outer bearing element 130. The spring 150 exerts an axial biasing force between the cap 70 and the outer bearing element 130. The force of the spring 150 acts to press the outer bearing element 130 against the inner bearing element 110, and to press the inner bearing element against the stud 80 and the seal 140.

The outer bearing element 130 supports the inner bearing element 110, and the stud 80, for pivotal movement about the pivot center 118 relative to the socket 60. The outer bearing element 130 also supports the inner bearing element 110, and the stud 80, for rotational movement about the stud axis 88 relative to the socket 60. In addition, the stud 80 is slidable axially, in the central opening 114 in the inner bearing element 110, relative to the bearing 100 and the socket 60.

In assembly of the vehicle suspension 12, the lower ball joint 50 is secured to the steering knuckle 40. The socket 60 of the upper ball joint 10 is pressed into the upper steering knuckle arm 42. A clip 160 retains the socket 60 in the upper steering knuckle arm 42. The upper ball joint 10 is thus secured to the steering knuckle 40.

The steering knuckle 40 is then joined with the steering yoke 14 so that the lower ball joint stud 52 extends into the opening 32 in the lower steering yoke arm 20 and the upper ball joint stud 80 extends into the opening 22 in the upper steering yoke arm 18. A nut 162 is first screwed onto the lower ball joint stud 52, securing the stud 52 to the lower steering yoke arm 20. A nut 164 is then screwed onto the threaded end portion 86 of the upper ball joint stud 80, securing the stud 80 to the upper steering yoke arm 18.

While the nut 164 is being screwed onto the stud 80, the upper steering yoke arm 18 is positioned adjacent the upper steering knuckle arm 42. The distance between the upper steering yoke arm 18 and the upper steering knuckle arm 42, as measured along the steering axis 30, may vary because of manufacturing tolerances in these two parts. This variability is accommodated during assembly of the suspension 12 by movement of the stud 80 in the socket 60 of the upper ball joint 10, in a direction parallel to the steering axis 30.

Figure 2:
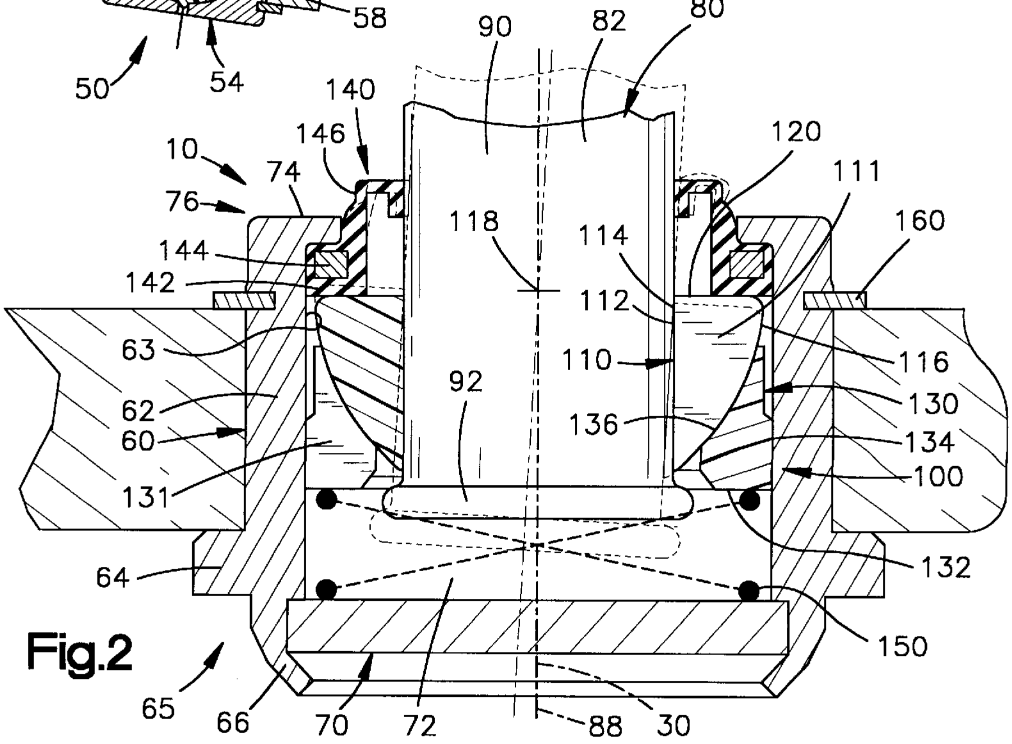
FIG. 2 is an enlarged view of the ball joint of FIG. 1.

Specifically, if the upper steering yoke arm 18 is relatively far from the upper steering knuckle arm 42, then the upper ball joint 10 assumes a condition as shown in solid lines in FIG. 2. In this condition, the stud 80 is positioned fairly high in the socket 60 so that the lower end portion 92 of the stud is adjacent to the inner and outer bearing elements 110 and 130. The lower end portion 92 of the stud 80 is spaced apart from the cap 70, defining a relatively large open space 166 between the stud and the cap. If, on the other hand, the upper steering yoke arm 18 is relatively close to the upper steering knuckle arm 42, then the stud 80 can move axially in the socket 60 so that the upper ball joint 10 will assume a condition as shown in dashed lines FIG. 2. In this condition, the stud 80 is closer to the cap 70. The open space 166 between the stud 80 and the cap 70 is smaller. Because the stud 80 can thus move axially in the socket 60 of the upper ball joint 10, the steering yoke 14 and the steering knuckle 40 need not be made to extremely tight tolerances simply to avoid improper positioning of the upper and lower ball joints 10 and 50.

When the vehicle suspension 12 is assembled, the upper and lower openings 22 and 32 in the steering yoke 14 are ideally coaxial, along the steering axis 30, with each other and with both the upper and lower openings 46 and 48 in the steering knuckle 40. Because of design or manufacturing tolerances it is unlikely that the all four of the openings 22, 32, 46 and 48 will be exactly coaxial. Such misalignment of the parts 14 and 40 of the suspension 12 can place undesired side loads on the ball joints 10 and 50, especially the upper ball joint 10, after the suspension is assembled.

These undesirable side loads are minimized because the stud 80 of the upper ball joint 10 is pivotable relative to the socket 60 of the upper ball joint. Specifically, the stud 80 and the inner bearing element 110 can pivot about the pivot center 118, during assembly of the suspension 12, relative to the outer bearing element 130 and the socket 60, so that the stud 80 in a coaxial relationship is received in the opening 22 in the upper steering yoke arm 18. The stud 80 of the upper ball joint 10 can then be secured to the upper steering yoke arm 18 with the nut 164, in a condition in which the upper ball joint is not stressed by side loads arising from misalignment or tolerance stackup of the suspension members 14 and 40 relative to the steering axis angle.

The axial biasing force of the spring 150 keeps the inner and outer bearing elements 110 and 130 in position between the stud 80 and the socket 60. The spring 150 yieldably resists movement of the inner and outer bearing elements 110 and 130 relative to the socket 60. As the bearing elements 110 and 130 wear during the lifetime of the ball joint 10, the inner bearing element 110 can collapse in on the stud 80, because of the slot 111. The split outer bearing element 130 can collapse in on the inner bearing element 110, because of the slot 131.

Figure 3:
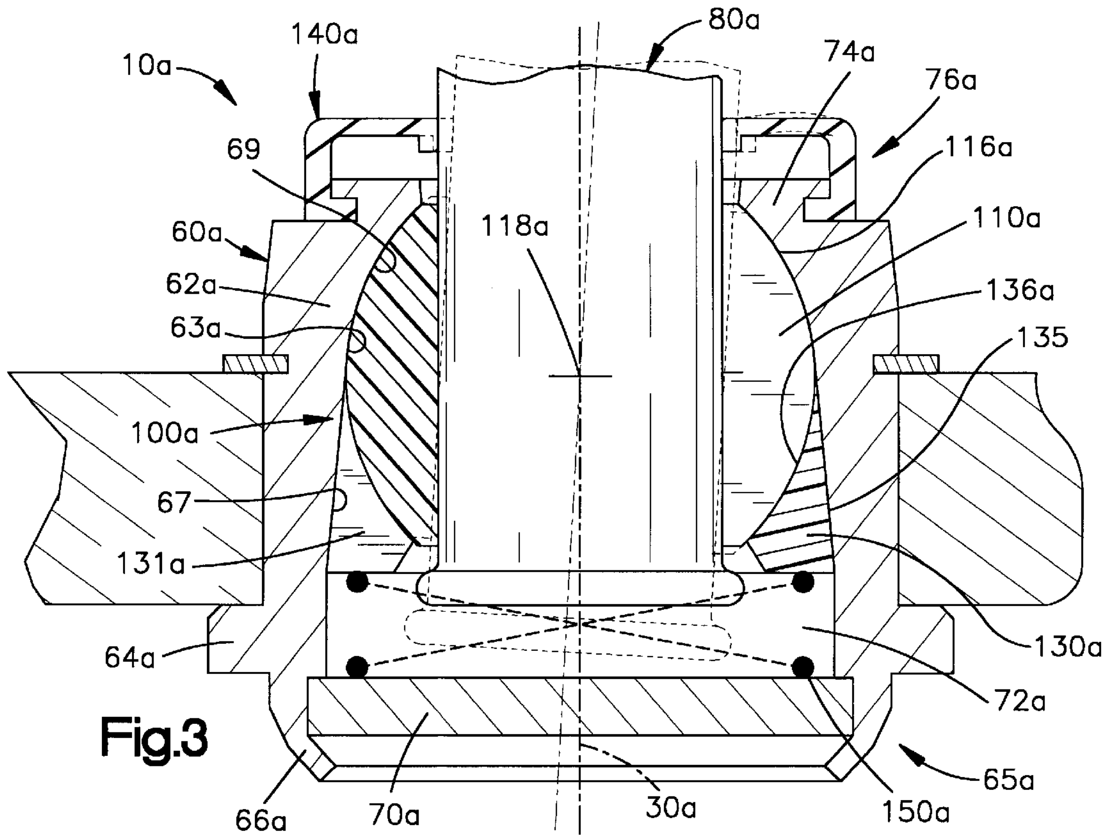
FIG. 3 is a view similar to FIG. 2 showing a ball joint constructed in accordance with a second embodiment of the invention.

FIG. 3 illustrates a ball joint **10*a* constructed in accordance with a second embodiment of the present invention. The ball joint 10*a* is similar in construction and operation to the ball joint 10 (FIGS. 1 and 2), and similar parts are given the same reference numeral with the suffix "a" added for clarity. The ball joint 10*a* is usable in the same environment (e.g., the vehicle suspension 12), as the ball joint 10. The stud 80*a* of the ball joint 10*a* is rotatable and pivotable, and also axially movable, in a manner similar to that of the stud 80 of the ball joint 10**.

The bearing **100*a* and the socket 60*a* of the ball joint 10*a* have a different configuration than the corresponding parts of the ball joint 10. Specifically, in the ball joint 10*b*, the inner surface 63*a* of the side wall 62*a* of the socket 60*a* has a tapered lower section 67. The lower section 67 tapers radially inward in a direction from the closed lower end 65*a* of the socket 60*a* to the open upper end 76*a* of the socket. The tapered section 67 merges with a spherical section 69 of the inner side surface 63*a* which extends upward and inward from the tapered section. The upper rim 74*a* of the socket 60*a* forms the upper end of the inner side surface 63*a* of the side wall 62*a* of the socket 60*a***.

The first bearing element **110*a* is relatively large and has a spherical outer surface 116*a*. The second bearing element 130*a* has a tapered outer side surface 135 and a spherical inner side surface 136*a*. The tapered outer side surface 135 of the second bearing element 130*a* is in sliding engagement with the tapered section 67 of the inner side surface 63*a* of the side wall 62*a* of the socket 60*a*. The spherical outer surface of the first bearing element 110*a* is in sliding engagement with the spherical inner surface of the second bearing element 130*a* and with the spherical section 69 of the inner side surface 63*a* of the side wall 62*a* of the socket 60*a*. As a result, the first bearing element 110*a* directly engages the socket 60*a* as well as the second bearing element 130*a*. In addition, the tapered configuration of the second bearing element 130*a* and the socket side wall 62*a*, together with the axial biasing force of the spring 150*a*, maintains the bearing elements 110*a* and 130*a* in engagement with the stud 80 and the socket 60*a***.

Figure 4:
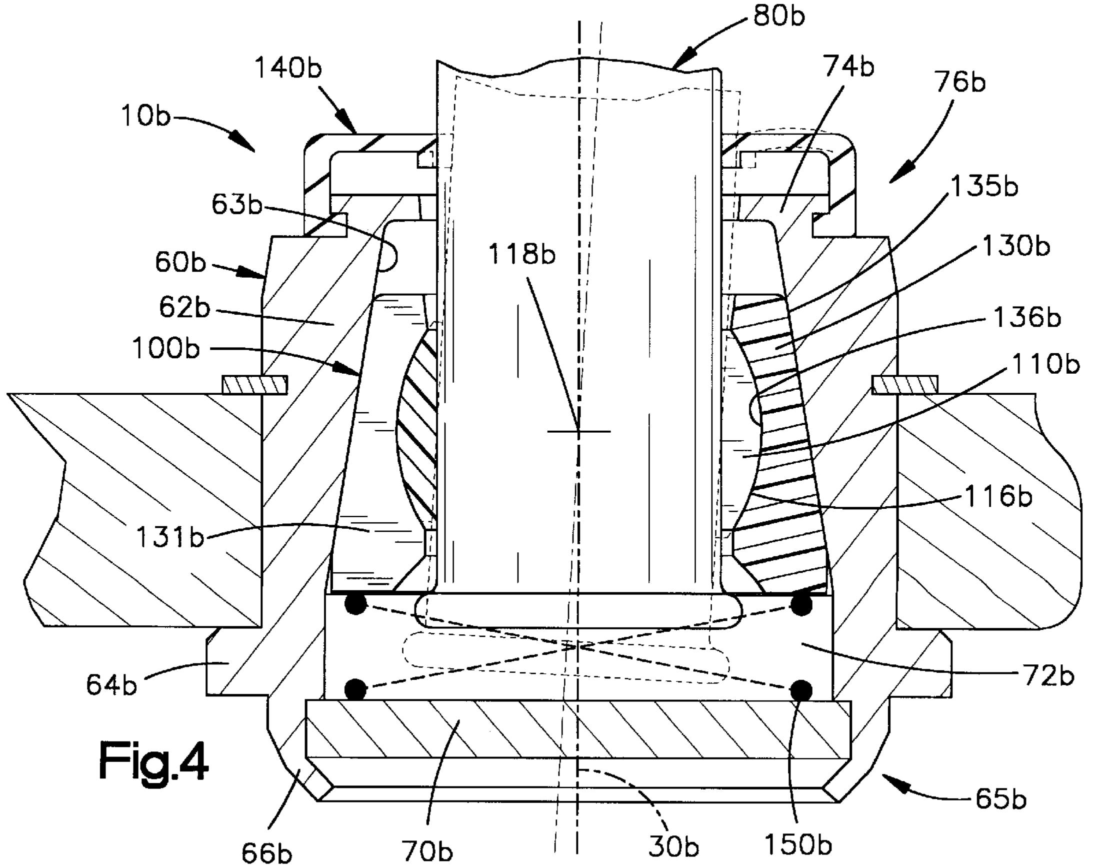
FIG. 4 is a view similar to FIG. 2 showing a ball joint constructed in accordance with a third embodiment of the invention.

FIG. 4 illustrates a ball joint **10*b* constructed in accordance with a second embodiment of the present invention. The ball joint 10*b* is similar in construction and operation to the ball joint 10*a* (FIG. 3), and similar parts are given the same reference numeral with the suffix "b" added for clarity. The ball joint 10*b* is usable in the same environment (e.g., the vehicle suspension 12), as the ball joint 10*a*. The stud 80*b* of the ball joint 10*b* is rotatable and pivotable, and also axially movable, in a manner similar to that of the stud 80*a* of the ball joint 10*a***.

The bearing **100*b* and socket of the ball joint 10*b* have a different configuration than the corresponding parts of the ball joint 10*a*. Specifically, in the ball joint 10*b*, the inner surface 63*b* of the side wall 62*b* of the socket 60*b* is tapered for its entire extent. The side surface 63*b* tapers radially inward in a direction from the closed lower end 65*b* of the socket 60*b* to the open upper end 76*b* of the socket. The upper rim 74*b* of the socket 60*b* defines the upper end of the tapered inner side surface 63*b* of the side wall 62*b*** of the socket.

The first bearing element **110*b* is relatively small and has a spherical outer surface 116*b*. The second bearing element 130*b* has a tapered outer side surface 135*b* which extends for the entire axial length of the second bearing element. The tapered outer side surface 135*b* of the second bearing element 130*b* is in sliding engagement with the tapered inner side surface 63*b* of the side wall 62*b* of the socket 60*b***.

The second bearing element **130*b* also has a spherical inner surface 136*b*. The spherical outer surface 116*b* of the first bearing element 110*b* is in sliding engagement with the spherical inner surface 136*b* of the second bearing element 130*b*. The first bearing element 110*b* does not directly engage the socket 60*b* but is supported completely in the second bearing element 130*b*. The tapered configuration of the second bearing element 130*b* and the socket side wall 62*b*, together with the axial biasing force of the spring 150*b*, maintains the bearing elements 110*b* and 130*b* in engagement with the stud 80*b* and the socket 60*b***.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus comprising:

first and second suspension members, said first member being rotatable about an axis relative to said second member, said first member having a first opening, said second member having a second opening spaced from said first opening in said first member by a first distance;

a ball joint for supporting said first suspension member for rotational movement relative to said second suspension member, said ball joint having a socket, a bearing in said socket, and a stud;

said bearing supporting a first end portion of said stud in said socket for movement relative to said socket;

said stud having a second end portion projecting from said socket for connecting said stud for movement with the first suspension member, said socket having a mounting portion for connecting said socket for movement with said second suspension member relative to said stud and said first suspension member;

said bearing comprising first and second relatively movable bearing elements;

said first bearing element being movable with said first end portion of said stud in said socket, said first bearing element having a pivot center;

said second bearing element being disposed between said first bearing element and said socket, said second bearing element supporting said first bearing element and said stud for pivotal movement relative to said socket about said pivot center; and a biasing spring acting between said socket and said second bearing element yieldably resisting movement of said first and second bearing elements relative to said socket.

2. Apparatus as set forth in claim 1 wherein said spring acts between said socket and said second bearing element to press said second bearing element against said first bearing element and to press said first bearing element against said stud.

3. Apparatus as set forth in claim 2 wherein each one of said first and second bearing elements is a split bearing.

4. Apparatus as set forth in claim 1 wherein said first bearing element has a spherical outer surface in sliding engagement with a spherical inner surface of said second bearing element, said spherical outer surface being centered on said pivot center.

5. Apparatus as set forth in claim 1 wherein said stud is movable in said socket relative to said socket and to said suspension member in a direction parallel to the steering axis.

6. Apparatus as set forth in claim 1 wherein said first bearing element has a hemispherical configuration and is supported in said socket by said second bearing element.

7. Apparatus as set forth in claim 1 wherein said first bearing element has a spherical configuration and has a spherical outer surface in engagement with said socket and with said second bearing element.

8. Apparatus as set forth in claim 1 wherein said first bearing element has a spherical configuration and is supported in said socket by said second bearing element.

* * * * *